United States Patent
Kim et al.

(10) Patent No.: US 12,170,791 B2
(45) Date of Patent: Dec. 17, 2024

(54) APPARATUS FOR TRANSMITTING 3D CONTENTS AND METHOD THEREOF

(71) Applicant: UNIVERSITY-INDUSTRY COOPERATION GROUP OF KYUNG HEE UNIVERSITY, Yongin-si (KR)

(72) Inventors: Jun Sik Kim, Ansan-si (KR); Kwi Jung Nam, Suwon-si (KR); Kyu Heon Kim, Seoul (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 35 days.

(21) Appl. No.: 18/073,882

(22) Filed: Dec. 2, 2022

(65) Prior Publication Data

US 2023/0217041 A1    Jul. 6, 2023

(30) Foreign Application Priority Data

Dec. 23, 2021  (KR) .................. 10-2021-0186477

(51) Int. Cl.
  *H04N 19/597* (2014.01)
  *H04N 19/184* (2014.01)
  *H04N 19/70* (2014.01)

(52) U.S. Cl.
  CPC ......... *H04N 19/597* (2014.11); *H04N 19/184* (2014.11); *H04N 19/70* (2014.11)

(58) Field of Classification Search
  CPC ..... H04N 19/184; H04N 19/597; H04N 19/70
  See application file for complete search history.

(56) References Cited

U.S. PATENT DOCUMENTS

2020/0314435 A1* 10/2020 Tourapis .................. G06T 7/74
2021/0227232 A1*  7/2021 Oh .................... H04N 21/42201
(Continued)

FOREIGN PATENT DOCUMENTS

| KR | 10-2021-0003937 A | 1/2021 |
| KR | 10-2021-0117142 A | 9/2021 |
| KR | 10-2300045 B1 | 9/2021 |

OTHER PUBLICATIONS

"Video-based Point Cloud Compression Artifact Removal"—Liu et al., IEEE Transactions on Multimedia; Date of Publication: Jun. 17, 2021. (Year: 2021).*

(Continued)

*Primary Examiner* — Mainul Hasan
(74) *Attorney, Agent, or Firm* — Sughrue Mion, PLLC (57) ABSTRACT

An apparatus for transmitting 3D contents includes an input configured to receive a point cloud to be converted into a 2D image; a global grid generator configured to create a global grid that determines a size of a 2D image to be converted from the point cloud; a point cloud converter configured to create a V3C bitstream in which the point cloud is converted to a 2D image of a size determined by the global grid based on V-PCC; and a grid information extractor configured to extract size information of the global grid from the V3C bitstream; an encapsulator configured to create ISOBMFF data based on the V3C bitstream and the extracted global grid size information; and a transmitter configured to transmit the ISOBMFF data.

12 Claims, 6 Drawing Sheets

(56) References Cited

U.S. PATENT DOCUMENTS

| | | | | |
|---|---|---|---|---|
| 2021/0235058 A1* | 7/2021 | Yip | ...................... | H04N 13/194 |
| 2021/0295567 A1* | 9/2021 | Lee | ......................... | G06T 9/001 |
| 2021/0320960 A1* | 10/2021 | Hur | ...................... | H04N 19/593 |
| 2022/0159261 A1* | 5/2022 | Oh | ...................... | H04N 19/119 |
| 2023/0224482 A1* | 7/2023 | Takahashi | .............. | H04N 19/70 |

OTHER PUBLICATIONS

"Adaptive Plane Projection for Video-Based Point Cloud Coding"—Lopes et al., 2019 IEEE International Conference on Multimedia and Expo (ICME). (Year: 2019).*

Korean Office Action for KR 10-2021-0186477, dated Oct. 24, 2022.

* cited by examiner

APPARATUS FOR TRANSMITTING 3D CONTENTS AND METHOD THEREOF

CROSS-REFERENCE TO RELATED APPLICATION

This application claims priority to Korean Patent Application No. 10-2021-0186477, filed on Dec. 23, 2021 in the Korean Intellectual Property Office, the disclosure of which is incorporated herein by reference.

BACKGROUND OF THE DISCLOSURE

Field of the Disclosure

The present disclosure relates to a technology for transmitting 3D contents composed of point clouds.

Description of the Related Art

A point cloud is a set of points with color, reflectance, etc. on a 3D space, and may be obtained using a studio installed with multiple cameras, lidar, or the like. A point cloud has the advantage of being able to express objects in detail in a 3D space. In MPEG under the international standardization organization ISO/IEC, Video based Point Cloud Compression (V-PCC) and Geometry based Point Cloud Compression (G-PCC) as methods of compressing point clouds are being standardized. V-PCC is a method of compressing high-density point cloud objects, and the compression process is as follows. After creating 2D patch data by projecting the point cloud onto 10 reference planes using the normal vectors of points, a 2D image may be created by efficiently arranging the patch data on the 2D image. At this time, three types of 2D images, i.e., occupancy indicating the presence or absence of points, geometry indicating the depth information of a patch, and attribute indicating information such as the color and reflectance of a patch, are created, and atlas data containing information in 3D space of each patch may be created. The created atlas data is compressed using entropy encoding, and 2D images of occupancy, geometry, and attribute are compressed using a conventional video codec such as HEVC. A bitstream generated through V-PCC is compatible with ISOBMFF and is stored in Visual Volumetric Video-based Coding (V3C) format that can efficiently store 3D information. A V3C bitstream consists of a V3C unit composed of a V3C unit header and a V3C unit payload, and a created V3C unit is multiplexed to form a V3C bitstream. At this time, since the V3C bitstream complies with the ISOBMFF standard, it can be transmitted using transmission methods such as Dynamic Adaptive Streaming over HTTP (DASH) and MPEG Media Transport (MMT) that are used for existing 2D video transmission.

Since V-PCC converts 3D content into a 2D image to compress the 2D image during compression, there is an advantage that an existing 2D content transmission method can be used as it is. However, since it is difficult for a 2D image created based on 3D content to have a constant size, each Group of Frame (GoF) unit has a different image size. This does not guarantee a constant bandwidth and causes iterative decoder initialization, which puts a great burden on both a transmitter and a receiver.

RELATED ART DOCUMENT

[Patent Document]
(Patent Document 1) Korean Patent No. 10-2300045, "AN APPARATUS FOR TRANSMITTING POINT CLOUD DATA, A METHOD FOR TRANSMITTING POINT CLOUD DATA, AN APPARATUS FOR RECEIVING POINT CLOUD DATA, AND A METHOD FOR RECEIVING POINT CLOUD DATA"

SUMMARY OF THE DISCLOSURE

Therefore, the present disclosure has been made in view of the above problems, and it is an object of the present disclosure to provide a technology for efficiently transmitting a V3C bitstream.

It is another object of the present disclosure to provide a technology for efficiently transmitting a V3C bitstream by adjusting the size of a 2D image converted from a point cloud based on V-PCC.

It is yet another object of the present disclosure to efficiently transmit a V3C bitstream to have a constant bandwidth of the V3C bitstream.

In accordance with an aspect of the present disclosure, the above and other objects can be accomplished by the provision of an apparatus for transmitting 3D contents, including: an input configured to receive a point cloud to be converted into a 2D image; a global grid generator configured to create a global grid that determines a size of a 2D image to be converted from the point cloud; a point cloud converter configured to create a V3C bitstream in which the point cloud is converted to a 2D image of a size determined by the global grid based on V-PCC; and a grid information extractor configured to extract size information of the global grid from the V3C bitstream; an encapsulator configured to create ISOBMFF data based on the V3C bitstream and the extracted global grid size information; and a transmitter configured to transmit the ISOBMFF data.

In an embodiment, the global grid generator may determine and generate a size of the global grid based on size information of patches required when converting the point cloud to the 2D image based on the V-PCC.

In an embodiment, the global grid generator may determine and create a size of the global grid based on a bounding box determined by a maximum value and minimum value of the point cloud included in the point cloud.

In an embodiment, the global grid generator may determine and create a size of the global grid based on a surface area of the point cloud.

In an embodiment, the global grid generator may determine and create a size of the global grid using a deep-learning model trained in advance to estimate a size of a 2D image from a point cloud.

In an embodiment, the encapsulator may use and include the extracted power grid information as initialization information of a decoder when creating the ISOBMFF data.

In an embodiment, the transmitter may transmit the ISOBMFF data based on DASH or MMT.

In accordance with another aspect of the present disclosure, there is provided a method of transmitting 3D contents, the method including: receiving a point cloud to be converted into a 2D image; creating a global grid that determines a size of a 2D image to be converted from the point cloud; creating a V3C bitstream in which the point cloud is converted to a 2D image of a size determined by the global grid based on V-PCC; and extracting size information of the global grid from the V3C bitstream; creating ISOBMFF data based on the V3C bitstream and the extracted global grid size information; and transmitting the ISOBMFF data.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

The embodiments will be described in detail herein with reference to the drawings.

However, it should be understood that the present disclosure is not limited to the embodiments according to the concept of the present disclosure, but includes changes, equivalents, or alternatives falling within the spirit and scope of the present disclosure.

In the following description of the present disclosure, a detailed description of known functions and configurations incorporated herein will be omitted when it may make the subject matter of the present disclosure unclear.

The terms used in the specification are defined in consideration of functions used in the present disclosure, and can be changed according to the intent or conventionally used methods of clients, operators, and users. Accordingly, definitions of the terms should be understood on the basis of the entire description of the present specification.

In description of the drawings, like reference numerals may be used for similar elements.

The singular expressions in the present specification may encompass plural expressions unless clearly specified otherwise in context.

In this specification, expressions such as "A or B" and "at least one of A and/or B" may include all possible combinations of the items listed together.

Expressions such as "first" and "second" may be used to qualify the elements irrespective of order or importance, and are used to distinguish one element from another and do not limit the elements.

It will be understood that when an element (e.g., first) is referred to as being "connected to" or "coupled to" another element (e.g., second), it may be directly connected or coupled to the other element or an intervening element (e.g., third) may be present.

As used herein, "configured to" may be used interchangeably with, for example, "suitable for", "ability to", "changed to", "made to", "capable of", or "designed to" in terms of hardware or software.

In some situations, the expression "device configured to" may mean that the device "may do~" with other devices or components.

For example, in the sentence "processor configured to perform A, B, and C", the processor may refer to a general-purpose processor (e.g., CPU or application processor) capable of performing corresponding operation by running a dedicated processor (e.g., embedded processor) for performing the corresponding operation, or one or more software programs stored in a memory device.

In addition, the expression "or" means "inclusive or" rather than "exclusive or."

That is, unless otherwise mentioned or clearly inferred from context, the expression "x uses a or b" means any one of natural inclusive permutations.

In the above-described specific embodiments, elements included in the disclosure are expressed singular or plural in accordance with the specific embodiments shown.

It should be understood, however, that the singular or plural representations are to be chosen as appropriate to the situation presented for the purpose of description and that the above-described embodiments are not limited to the singular or plural constituent elements. The constituent elements expressed in plural may be composed of a single number, and constituent elements expressed in singular form may be composed of a plurality of elements.

In addition, the present disclosure has been described with reference to exemplary embodiments, but it should be understood that various modifications may be made without departing from the scope of the present disclosure.

Therefore, the scope of the present disclosure should not be limited by the embodiments, but should be determined by the following claims and equivalents to the following claims.

Figure 1:
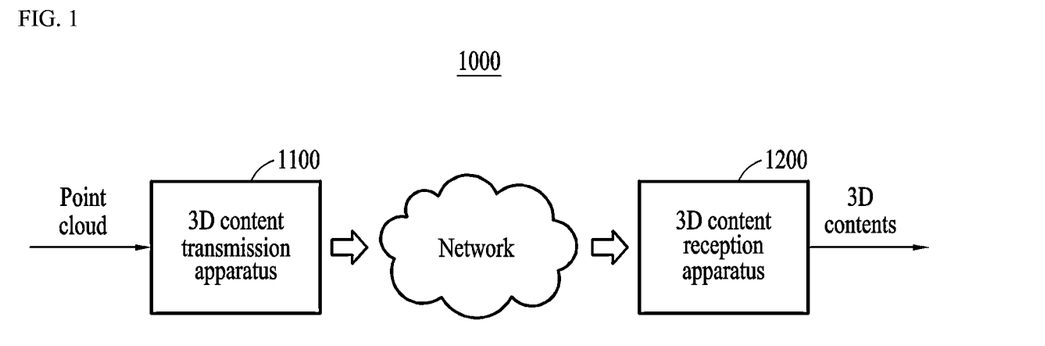
FIG. 1 is a diagram for explaining a 3D content transmission system according to an embodiment of the present disclosure.

FIG. 1 is a diagram for explaining a 3D content transmission system according to an embodiment of the present disclosure.

Referring to FIG. 1, the 3D content transmission system 1000 includes a 3D content transmission apparatus 1100 and a 3D content reception apparatus 1200. These apparatuses may be interconnected to enable data exchange through a wired/wireless network.

The 3D content transmission apparatus 1100 may receive a point cloud for 3D contents. The 3D content transmission apparatus 1100 may create a V3C bitstream in which a point cloud is converted into a 2D image based on C-VPCC. In this case, the size of the created 2D image is determined by a global grid. The 3D content transmission apparatus 1100 may create ISBMFF (ISO/IEC base media file format) based on the V3C bitstream and global grid information and may transmit the created ISBMFF to the 3D content reception apparatus 1200.

The 3D content reception apparatus 1200 may receive the ISBMFF from the 3D content transmission apparatus 1100, and may restore a point cloud in consideration of an initialization time of a decoder according to the global grid information to output 3D contents. Here, since the process of restoring the point cloud is the same as an existing method of restoring a point cloud compressed according to V-PCC, a detailed description thereof is omitted.

Figure 2:
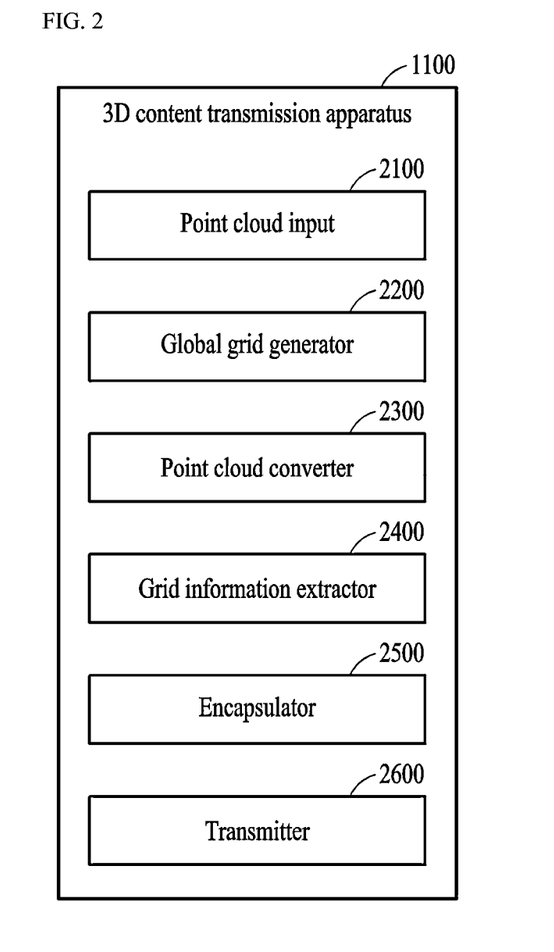
FIG. 2 illustrates a block diagram of an apparatus for transmitting 3D contents according to an embodiment of the present disclosure.

FIG. 2 illustrates a block diagram of an apparatus for transmitting 3D contents according to an embodiment of the present disclosure.

Referring to FIG. 2, the 3D content transmission apparatus 1100 may include a point cloud input 2100, a global grid generator 2200, a point cloud converter 2300, a grid information extractor 2400, an encapsulator 2500 and a transmitter 2600.

The point cloud input 2100 may receive a point cloud which is 3D content to be transmitted.

The global grid generator 2200 may create a global grid that determines the size of the 2D image converted from the point cloud according to V-PCC.

In an embodiment, the global grid is a variable global grid that supports a bandwidth similar to existing compression performance of V-PCC for multiple GOFs, or a maximum global grid with low compression efficiency compared to existing compression performance of V-PCC for all GOFs.

In an embodiment, the global grid generator 2200 may be generated based on size information of patches. The atlas information includes information on the positions and sizes on 2D of patches and positions on 3D of the patches which are required to transform a 3D point cloud into a 2D plane. When this atlas information is used, a grid size of a 2D projection to which the point cloud is to be converted may be predicted as shown in Equations 1 and 2 below:

$$X_{grid} = X_{grid} + X_{patch[i]} \cdot X_{patch[i]} \geq \mu_x \quad \text{[Equation 1]}$$

$$Y_{grid} = Y_{grid} + Y_{patch[i]} \cdot Y_{patch[i]} \geq \mu_y \quad \text{[Equation 2]}$$

where $X_{grid}$ and $Y_{grid}$ mean an X-axis length and Y-axis length of the grid in the 2D image, respectively. The size of the 2D grid may be predicted by utilizing the size of a patch larger than $\mu_x$ or $\mu_y$ predefined according to the point cloud contents. The size of the global grid may be calculated according to Equations 3 and 4 below based on the predicted size of the 2D grid:

$$X_{global\text{-}grid} = X_{grid} * \varepsilon_x \quad \text{[Equation 3]}$$

$$Y_{global\text{-}grid} = Y_{grid} * \varepsilon_y \quad \text{[Equation 4]}$$

where $X_{global\text{-}grid}$ and $Y_{global\text{-}grid}$ indicate an X-axis length and Y-axis length of the global grid, respectively. A global 2D grid may be created by multiplying the predicted sizes $X_{grid}$ and $Y_{grid}$ of the 2D grid by predefined $\varepsilon_x$ and $\varepsilon_y$. $\varepsilon_x$ and $\varepsilon_y$ may be defined according to the input content or the features of Video Codec used during compression. Here, whether to generate the created global grid as a variable global grid or as a maximum global grid may be determined according to predefined variables.

Figure 3:
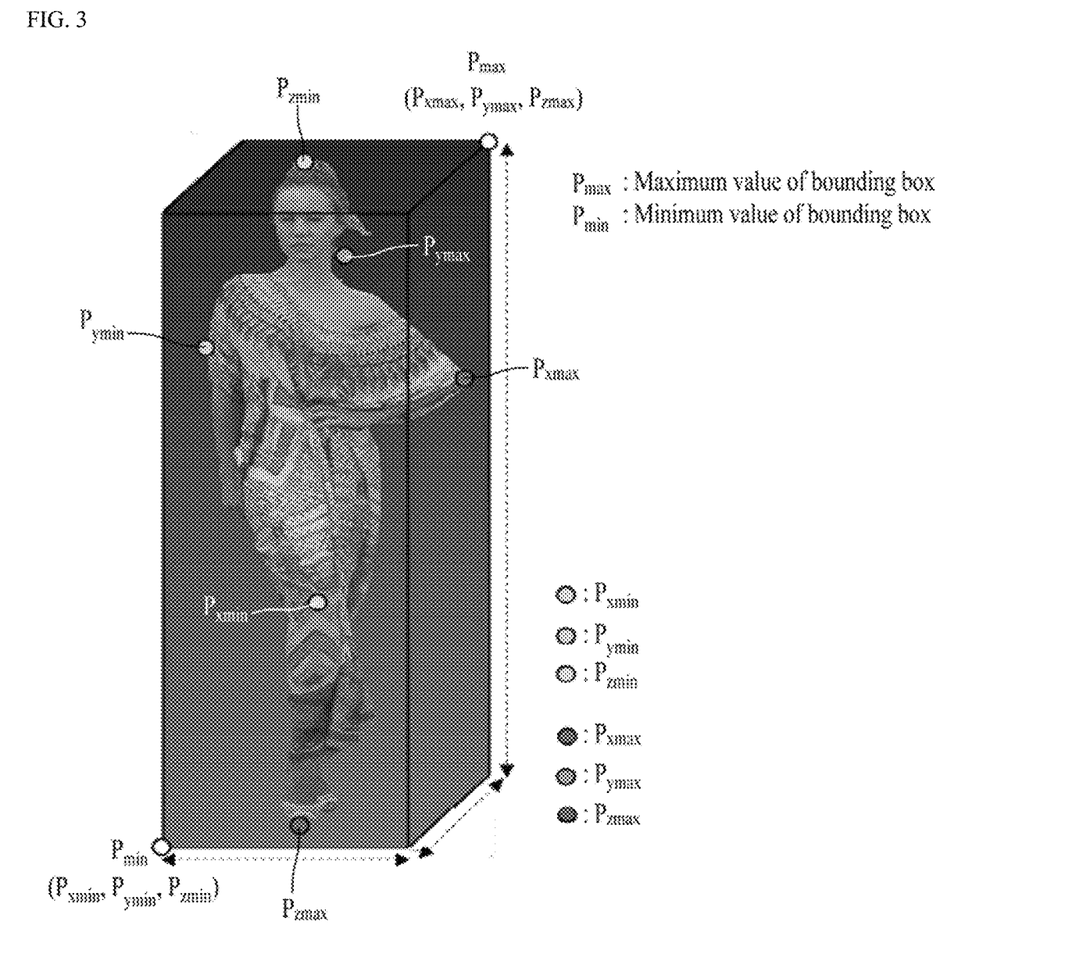
FIG. 3 illustrates a diagram for explaining a method of creating a global grid based on a bounding box according to an embodiment of the present disclosure.

In an embodiment, the global grid generator 2200 may be created based on a bounding box. The global grid generator 2200 may create the smallest 3D box, i.e., the bounding box, including all points by utilizing the maximum and minimum values of each point of the input point cloud. As shown in FIG. 3, the bounding box may be expressed as two maximum points and two minimum points as shown in FIG. 3. In FIG. 3, the six points on the right indicate points having the minimum or maximum values of the X, Y, and Z axes, and the bounding box as shown in FIG. 3 may be created based on the point $P_{min}$ made with the minimum value of each axe and the point $P_{max}$ made with the maximum value of each axe. The size of the created bounding box indicates the maximum distance of each axis, and based on this, it is possible to calculate the global grid according to Equations 5 and 6 below:

$$X_{global\text{-}grid} = (p_{xmax} - p_{xmin}) * \delta_x + (p_{ymax} - p_{ymin}) * \delta_y + (p_{zmax} - p_{zmin}) * \delta_z \quad \text{[Equation 5]}$$

$$Y_{global\text{-}grid} = (p_{xmax} - p_{xmin}) * \gamma_x + (p_{ymax} - p_{ymin}) * \gamma_y + (p_{zmax} - p_{zmin}) * \gamma_z \quad \text{[Equation 6]}$$

The size of the global 2D grid may be calculated using predefined $\delta_x$, $\delta_y$, $\delta_z$, $\gamma_x$, $\gamma_y$, and $\gamma_z$ according to the length of each axis in the bounding box and input point cloud contents. In addition, it is obvious that not only the straight-line length of the bounding box but also the diagonal length thereof may be used, and the bounding box may be converted into various 3D figures instead of a cuboid. Here, whether to generate the created global grid as a variable global grid or as a maximum global grid may be determined using predefined variables.

In an embodiment, The global grid generator 2200 may be created based on the surface area of the point cloud. A patch may be generated as wide as the surface area of the input point cloud, and the size of the 2D grid may be determined based on the patch. That is, by using the surface area, the size of the power grid may be predicted as in Equation 7 below:

$$X_{global\text{-}grid} * Y_{global\text{-}grid} = S * \tau_s \quad \text{[Equation 7]}$$

where S is the surface area of the input point cloud, and $\tau_s$ is a variable predefined according to the features of the point cloud. The width of the global grid is determined by correcting the value of S with $\tau_s$, and the size of each axis is determined according to the features of a video codec used. Here, whether to create the created global grid as a variable global grid or as a maximum global grid may be determined using predefined variables.

Figure 4:
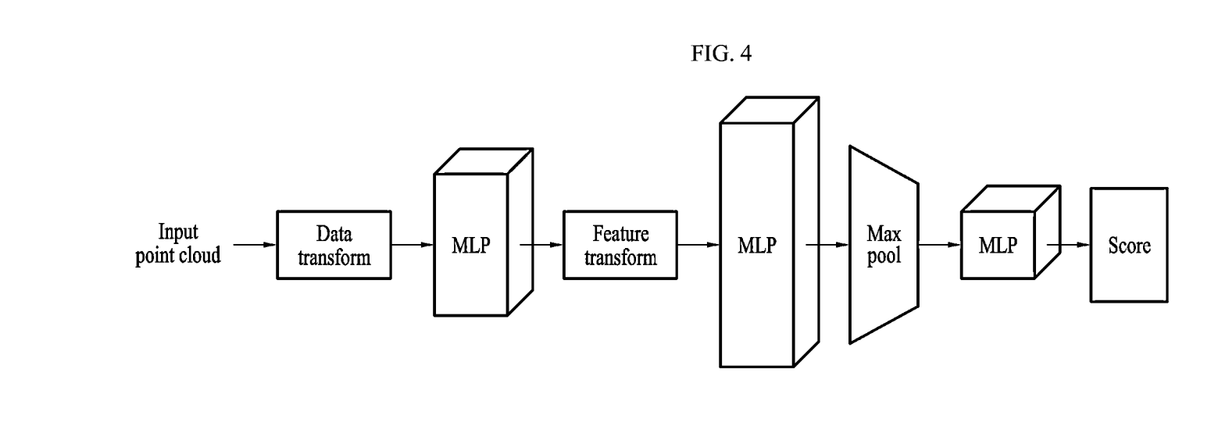
FIG. 4 illustrates a diagram for explaining a method of creating a global grid based on a deep learning model according to an embodiment of the present disclosure.

In an embodiment, a global grid may be created based on a global deep-learning model. A global grid calculation method using a deep-learning model has the advantage of effectively identifying the composition of points in an input point cloud and creating a global grid based on this. FIG. 4 is an embodiment of a deep learning structure utilizing a point cloud. Since a voxel structure of an input point cloud is unordered data, it needs to be processed to be invariant to permutations. Accordingly, a feature of an input point cloud having a permutation-invariant feature may be created through a feature extraction process using a Multi-Layer Perceptron (MLP). Here, an input may be made by performing various dimensional transformation processes according to the features of the input point cloud. The created feature data may be converted into global features that deal with the overall features of an input point cloud through MLP and Max pooling processes. The score value may be derived by performing MLP based on the global features, and the score may be compared with the 2D grid obtained in the patch generation and packing process of V-PCC and may be used for learning. A global grid for the input point cloud may be created with the learned score value. Here, whether to create the created global grid as a variable global grid or as a maximum global grid may be determined according to the size of the 2D grid used for training.

The point cloud converter 2300 may convert the point cloud into a 2D image based on V-PCC, and may create a V3C bitstream in which the point cloud is transformed into a 2D image. In the point cloud, the size of the 2D image may be determined by the size of the global grid.

The grid information extractor 2400 may extract global grid information by scanning Atlas Sequence Parameter Set (ASPS) information in the V3C bitstream. Here, the global grid information may include whether the global grid is used, whether the global grid is a variable global grid or a maximum global grid, the size of the global grid, etc.

The encapsulator 2500 may create ISOMFF data by encapsulating V3C bitstream and global grid information according to the MPEG-I Carriage of V3C data standard.

In an embodiment, the encapsulator 2500 may further create an SEI message when the size of the 2D image is determined according to the global grid. The SEI message (global grid initialization message) is for specifying an initialization time of a decoder. By transmitting the SEI message at the time when the grid size of GoF is changed, the decoder initialization time and decoder initialization information may be transmitted to the 3D content reception apparatus 1200. Table 1 below shows an example of the SEI message.

TABLE 1

|  | Descriptor |
| --- | --- |
| global grid initialization(payloadSize) { | |
|   global_grid_initialization_flag | u(1) |
|   Reserved=0 | u(7) |
|   If (global_grid_initialization_flag==1) { | |
|     global_grid_width | u(32) |
|     global_grid_height | u(32) |
|   } | |
| } | |

Here, global_grid_initialization_flag indicates whether the decoder is initialized so it has a value of 0 when the global grid size of the sample is the same as the global grid size of a previous sample, and has a value of 1 when the global grid size of the sample is different from the global grid size of the previous sample. global_grid_width and global_grid_height are size information of the global grid of the next frame, and may provide decoder initialization information. When the global_grid_initialization_flag has a value of 0, decoding of a sample is possible without initialization of the decoder because the decoder initialization information of the sample does not change. When global_grid_initialization_flag has a value of 1, the decoder should be initialized using the global_grid_width and global_grid_height values. A frame size initialization message may be created at regular intervals like the GoF unit, and may be created only when the frame size is changed.

In an embodiment, the encapsulator 2500 may create a V3C maximum global grid box as shown below when the global grid is a maximum global grid. Here, the maximum global grid box may be used only when V-PCC compression is compressed using a maximum global grid. The creation of the V3C maximum global grid box may create the V3C Maximum Global Grid box ('vmgg') inside the SampleEntry box ('v3c1', 'v3cg', 'v3cb', 'v3a1', or 'v3ag') to include a process of storing the maximum global grid size information of the entire V3C bitstream. Table 2 below shows an example of the V3C maximum global grid box.

TABLE 2

Definition
Box Types:   'vmgg'
Container:   Sample Entry ('v3c1', 'v3cg', 'v3cb', 'v3a1' or 'v3ag')
Mandatory:   No
Quantity:   one
Syntax
aligned(8) class V3CmaximumglobalgridBox extends
FullBox('vmgg', version = 0, 0) {
  unsigned int(32) maximum_grid_width;
  unsigned int(32) maximum_grid_height;
}

Here, the V3C maximum global grid box may be created by using the maximum global grid size information obtained in the grid scan step, and, in the V3C maximum global grid box, the maximum_grid_width and maximum_grid_height information indicate the height and width of the maximum global grid.

The transmitter 2600 may transmit the V3C bitstream, which is converted to the ISOBMFF standard, to the 3D content reception apparatus 1200. Here, the transmitter 2600 may transmit the V3C bitstream, converted to the ISOBMFF standard, to the 3D content reception apparatus 1200 using an existing 2D image transmission technique.

In an embodiment, the transmitter 2600 may transmit the ISOBMFF file, in which the V3C bitstream is converted, to the 3D content reception apparatus 1200 based on Dynamic Adaptive Streaming over HTTP (DASH). In DASH, MPD (Media Presentation Description) is configured using the Carriage of V3C data standard technology, and the global grid initialization message created through SEI message creation may be delivered through an event signaling method such as event stream or emsg box of the 23009 standard. MPEG-I Carriage of V3C data standard technology may also be used for V3C bitstream information transmission.

In an embodiment, the transmitter 2600 may transmit the ISOBMFF file, in which the V3C bitstream is converted, to the 3D content reception apparatus 1200 based on MMT. In MMT, the Media Presentation Table (MPT) may be configured using the Carriage of V3C data standard technology, and the global grid initialization message created through the SEI message creation may be transmitted through an event signaling method such as Application Event Information (AEI) or evti box of the 23008-1 standard. MPEG-I Carriage of V3C data standard technology may also be used for V3C bitstream information transmission.

Figure 5:
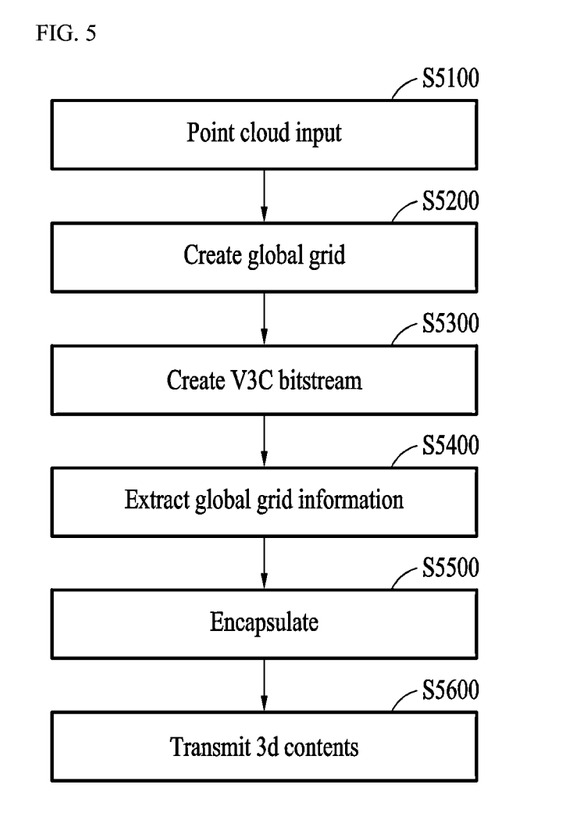
FIG. 5 illustrates a flowchart of a 3D content transmission method according to an embodiment of the present disclosure.

FIG. 5 illustrates a flowchart of a 3D content transmission method according to an embodiment of the present disclosure.

Hereinafter, an embodiment of the method of FIG. 5 performed by the 3D content transmission apparatus 1100 shown in FIG. 1 is described as an example.

In S5100, the 3D content transmission apparatus 1100 may receive a point cloud that is 3D content to be transmitted.

In S5200, the 3D content transmission apparatus 1100 may create a global grid that determines the size of a 2D image converted from the point cloud according to V-PCC.

In an embodiment, the 3D content transmission apparatus 1100 may be a variable global grid supporting a bandwidth similar to an existing compression performance of V-PCC for multiple GOFs or a maximum global grid with low compression efficiency compared to the existing compression performance of V-PCC for all GOFs.

In an embodiment, the 3D content transmission apparatus 1100 may be created based on size information of patches.

In an embodiment, the 3D content transmission apparatus 1100 may be created based on a bounding box.

In an embodiment, the 3D content transmission apparatus 1100 may be created based on a surface area of the point cloud.

In an embodiment, a global grid may be created based on a global deep-learning model.

In S5300, the 3D content transmission apparatus 1100 may convert a point cloud to a 2D image based on V-PCC, and may create a V3C bitstream in which the point cloud is transformed into the 2D image. The size of the point cloud 2D image may be determined by the size of the global grid.

In S5400, the 3D content transmission apparatus 1100 may scan Atlas Sequence Parameter Set (ASPS) information in the V3C bitstream to extract global grid information.

Here, the global grid information may include whether the global grid is used, whether the global grid is a variable global grid or a maximum global grid, the size of the global grid, etc.

In S5500, the 3D content transmission apparatus 1100 may create ISOMFF data by encapsulating the V3C bitstream and the global grid information according to the MPEG-I Carriage of V3C data standard.

In S5600, the 3D content transmission apparatus 1100 may transmit a V3C bitstream converted to the ISOBMFF standard to the 3D content reception apparatus 1200. Here, the transmitter 2600 may transmit the V3C bitstream, converted to the ISOBMFF standard, to the 3D content reception apparatus 1200 using an existing 2D image transmission technique. Here, the 3D content reception apparatus 1200 may parse data transmitted through DASH or MMT, and may reconstruct a V3C bitstream to a point cloud. The 3D content transmission apparatus 1100 may determine whether to initialize a decoder based on the frame size initialization message transmitted by the 3D content reception apparatus 1200 to reduce a load and may avoid receiving unnecessary initialization information. Here, MPEG-I Carriage of V3C data standard technology may be used for the restoration of the V3C bitstream and the reconstruction of the point cloud.

Figure 6:
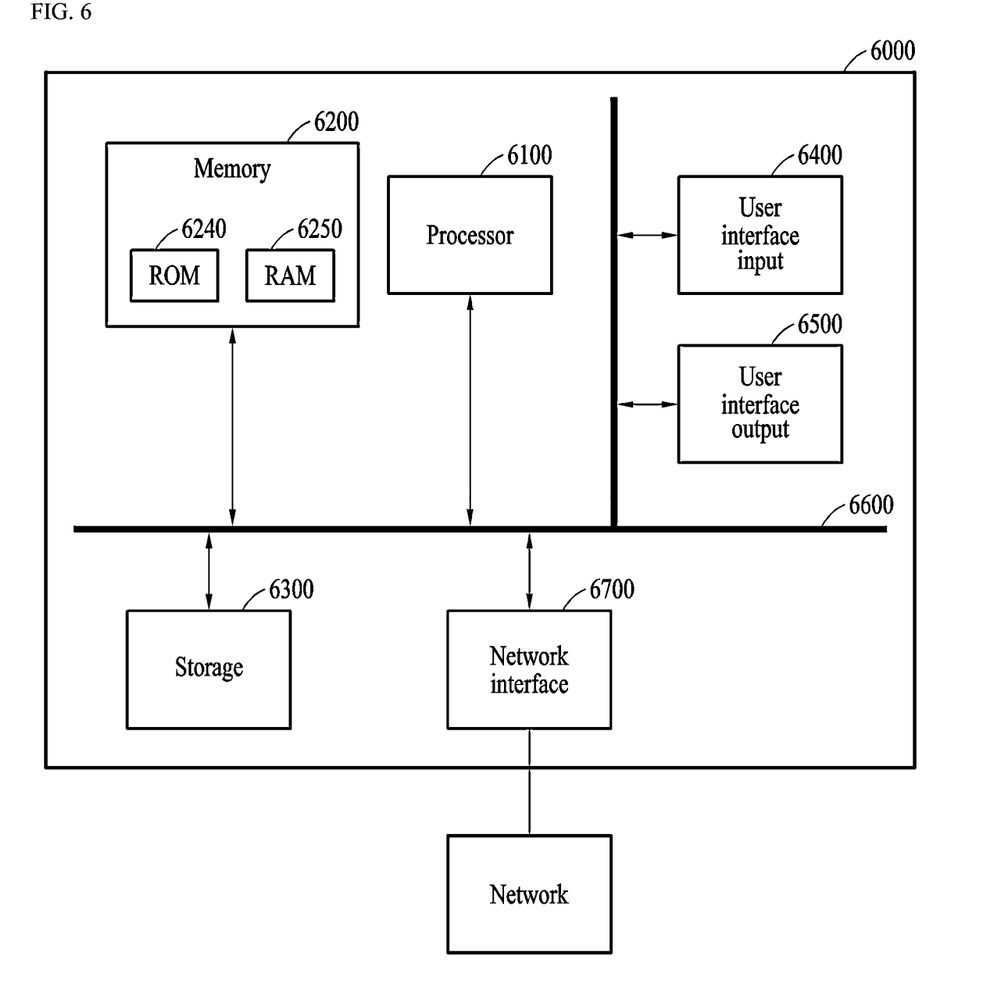
FIG. 6 illustrates a block diagram of a 3D content transmission apparatus according to another embodiment of the present disclosure.

FIG. 6 illustrates a block diagram of an apparatus for transmitting 3D contents according to another embodiment of the present disclosure.

As shown in FIG. 6, the 3D content transmission apparatus 6000 may include at least one element of a processor 6100, a memory 6200, a storage 6300, a user interface input 6400, and a user interface output 6500. These elements may communicate with each other via a bus 6600. In addition, the 3D content transmission apparatus 6000 may also include a network interface 6700 for accessing a network. The processor 6100 may be a CPU or semiconductor device that executes processing instructions stored in the memory 6200 and/or the storage 6300. The memory 6200 and the storage 6300 may include various types of volatile/nonvolatile storage media. For example, the memory may include ROM 6240 and RAM 6250.

According to an aspect of the present disclosure, a V3C bitstream can be efficiently transmitted.

In addition, according to another aspect of the present disclosure, a V3C bitstream can be efficiently transmitted by adjusting the size of a 2D image converted from a point cloud based on V-PCC.

Further, according to another aspect of the present disclosure, a V3C bitstream can be efficiently transmitted to have a constant bandwidth of the V3C bitstream.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The methods according to the embodiments of the present disclosure may be implemented in the form of a program command that can be executed through various computer means and recorded in a computer-readable medium. The computer-readable medium can store program commands, data files, data structures or combinations thereof. The program commands recorded in the medium may be specially designed and configured for the present disclosure or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code created by a compiler and high-level language code executable by a computer using an interpreter and the like. The hardware devices described above may be configured to operate as one or more software modules to perform the operations of the embodiments, and vice versa.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

[Description of Symbols]

| | |
|---|---|
| 1000: 3D content transmission system | 1100: apparatus for transmitting 3D contents |
| 1200: 3D content reception apparatus | 2100: point cloud input |
| 2200: global grid generator | 2300: point cloud converter |
| 2400: grid information extractor | 2500: encapsulator |
| 2600: transmitter | |

What is claimed is:

1. An apparatus for transmitting 3D contents, the apparatus comprising:

a memory configured to store computer-readable instructions; and one or more processors configured to execute the computer-readable instructions such that the one or more processors are configured to:

receive a point cloud to be converted into a 2D image;

create a global grid that determines a size of a 2D image to be converted from the point cloud;

create a Visual Volumetric Video-based Coding (V3C) bitstream in which the point cloud is converted to a 2D image of a size determined by the global grid based on Video based Point Cloud Compression (V-PCC);

extract size information of the global grid from the V3C bitstream;

create ISO Base Media File Format (ISOBMFF) data based on the V3C bitstream and the extracted global grid size information; and transmit the ISOBMFF data, wherein the one or more processors are configured to:

determine and create a size of the global grid based on a bounding box determined by a maximum value and a minimum value of the point cloud comprised in the point cloud, and calculate the global grid according to equations below, based on the generated bounding box, $$X\text{global-grid}=(p x\max-p x\min)*\delta x+(p y\max-p y\min)*\delta y+(p z\max-p z\min)*\delta z$$

$$Y\text{global-grid}=(p x\max-p x\min)*\gamma x+(p y\max-p y\min)*\gamma y+(p z\max-p z\min)*\gamma z,$$

wherein the size of the global grid is calculated using predefined variables δx, δy, δz, γx, γy, and γz according to the length of each axis in the bounding box and input point cloud contents.

2. The apparatus according to claim 1, wherein the one or more processors are configured to determine and generate the size of the global grid based on size information of patches required when converting the point cloud to the 2D image based on the V-PCC.

3. The apparatus according to claim 1, wherein the one or more processors are configured to determine and create the size of the global grid based on a surface area of the point cloud.

4. The apparatus according to claim 1, wherein the one or more processors are configured to determine and create the size of the global grid using a deep-learning model trained in advance to estimate a size of a 2D image from a point cloud.

5. The apparatus according to claim 1, wherein the one or more processors are configured to use and comprise an extracted power grid information as initialization information of a decoder when creating the ISOBMFF data.

6. The apparatus according to claim 1, wherein the one or more processors are configured to transmit the ISOBMFF data based on Dynamic Adaptive Streaming over HTTP (DASH) or MPEG Media Transport (MMT).

7. A method of transmitting 3D contents, the method comprising:

receiving a point cloud to be converted into a 2D image;

creating a global grid that determines a size of a 2D image to be converted from the point cloud;

creating a Visual Volumetric Video-based Coding (V3C) bitstream in which the point cloud is converted to a 2D image of a size determined by the global grid based on Video based Point Cloud Compression (V-PCC); and extracting size information of the global grid from the V3C bitstream;

creating ISO Base Media File Format (ISOBMFF) data based on the V3C bitstream and the extracted global grid size information; and transmitting the ISOBMFF data, wherein the method comprises:

determining and creating a size of the global grid based on a bounding box determined by a maximum value and minimum value of the point cloud comprised in the point cloud, and calculating the global grid according to equations below, based on the generated bounding box, $$X\text{global-grid}=(p x\max-p x\min)*\delta x+(p y\max-p y\min)*\delta y+(p z\max-p z\min)*\delta z$$

$$Y\text{global-grid}=(p x\max-p x\min)*\gamma x+(p y\max-p y\min)*\gamma y+(p z\max-p z\min)*\gamma z,$$

wherein the size of the global grid is calculated using predefined variables δx, δy, δz, γx, γy, and γz according to the length of each axis in the bounding box and input point cloud contents.

8. The method according to claim 7, wherein the size of the global grid is determined based on size information of patches required when converting the point cloud to the 2D image based on the V-PCC.

9. The method according to claim 7, wherein the size of the global grid is determined based on a surface area of the point cloud.

10. The method according to claim 7, wherein the size of the global grid is determined using a deep-learning model trained in advance to estimate a size of a 2D image from a point cloud.

11. The method according to claim 7, wherein in the creating of the ISOBMFF data, the ISOBMFF data is transmitted based on Dynamic Adaptive Streaming over HTTP (DASH) or MPEG Media Transport (MMT).

12. The method according to claim 7, wherein in the transmitting of the ISOBMFF data, the ISOBMFF data is transmitted based on Dynamic Adaptive Streaming over HTTP (DASH) or MPEG Media Transport (MMT).

* * * * *